United States Patent
Swanson et al.

(10) Patent No.: US 6,513,856 B1
(45) Date of Patent: Feb. 4, 2003

(54) ROLL ASSIST MECHANISM FOR TARP SYSTEMS

(75) Inventors: Bradford P. Swanson, Yankton, SD (US); Christopher J. McCallum, Yankton, SD (US)

(73) Assignee: Shur Company, Yankton, SD (US)

( * ) Notice: Subject to any disclaimer, the term of this patent is extended or adjusted under 35 U.S.C. 154(b) by 0 days.

(21) Appl. No.: 10/109,492

(22) Filed: Mar. 28, 2002

(51) Int. Cl.$^7$ ................................................ B60P 7/04
(52) U.S. Cl. ................ 296/98; 296/100.15; 296/100.16
(58) Field of Search ............................ 296/98, 100.15, 296/100.16, 100.18

(56) References Cited

U.S. PATENT DOCUMENTS

| | | | |
|---|---|---|---|
| 3,829,154 A | * | 8/1974 | Becknell ................... 296/98 |
| RE31,746 E | | 11/1984 | Dimmer et al. |
| 4,484,777 A | * | 11/1984 | Michel ..................... 296/98 |
| 4,505,512 A | * | 3/1985 | Schmeichel et al. ........ 296/98 |
| 4,529,098 A | * | 7/1985 | Heider et al. .............. 296/98 |
| 4,691,957 A | * | 9/1987 | Ellingson .............. 296/100.15 |
| 5,002,328 A | * | 3/1991 | Michel ..................... 296/98 |
| 5,303,972 A | * | 4/1994 | Heider et al. .............. 296/98 |
| 5,487,584 A | | 1/1996 | Jespersen |
| 5,658,037 A | * | 8/1997 | Evans et al. ............... 296/98 |
| 5,765,901 A | * | 6/1998 | Wilkens .................... 296/98 |
| 5,924,758 A | | 7/1999 | Dimmer et al. |
| 6,199,935 B1 | * | 3/2001 | Waltz et al. ................ 296/98 |
| 6,206,449 B1 | * | 3/2001 | Searfoss ................... 296/98 |
| 2002/0021018 A1 | * | 2/2002 | Royer ...................... 296/98 |
| 2002/0084672 A1 | * | 7/2002 | Searfoss ................ 296/100.18 |

FOREIGN PATENT DOCUMENTS

CA       1241982       1/1984

OTHER PUBLICATIONS

Website article re: www.mavericksprings.com, 3 pages.
Website article re: www.trakar.com, 2 pages.
Website article re: www.emmottsprings.com, 2 pages.
Website article re: www.gardnerspring.com, 2 pages.
Website article re: www.vulcanspring.com, 2 pages.
Website article re: www.sdp-si.com, 2 pages.

* cited by examiner

Primary Examiner—D. Glenn Dayoan
Assistant Examiner—Jason Morrow
(74) Attorney, Agent, or Firm—Jones, Day, Reavis & Pogue

(57) ABSTRACT

In a tarp system used to cover an open container such as a truck, the tarp being connected on one longitudinal edge to a roll bar, an improved mechanism for assisting movement of the roll bar comprises one or more constant force springs, each spring attached at one end to a longitudinal side of the container and at the other end to a reel mounted on the roll bar. When the roll bar is at one side of the container, the tarp is rolled around the roll bar and the constant force springs are extended. As the bar rolls across to the opposite side, the tarp is unrolled to cover the container opening, and the constant force springs wind into a coil around the reel.

23 Claims, 5 Drawing Sheets

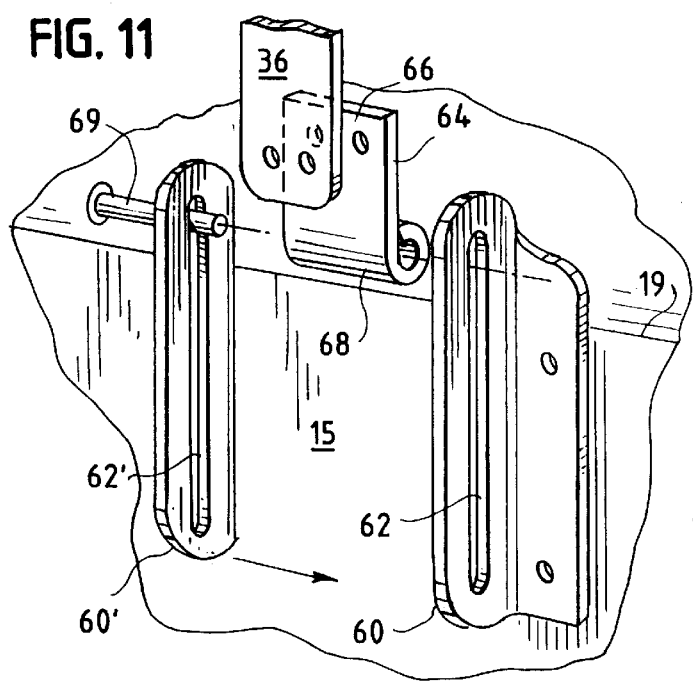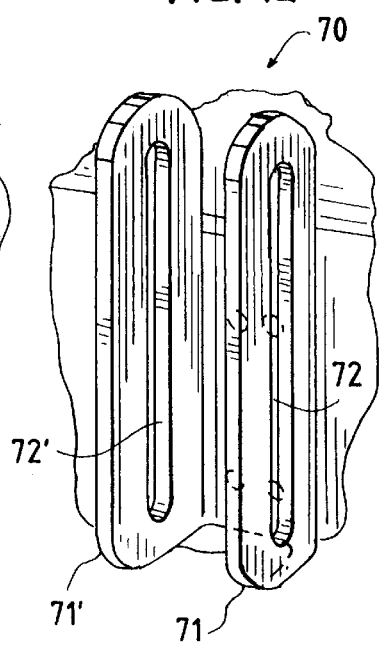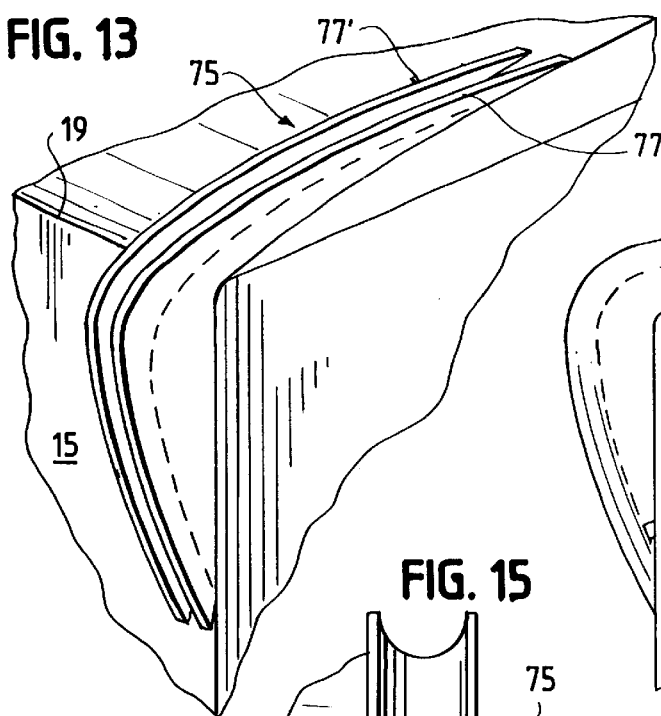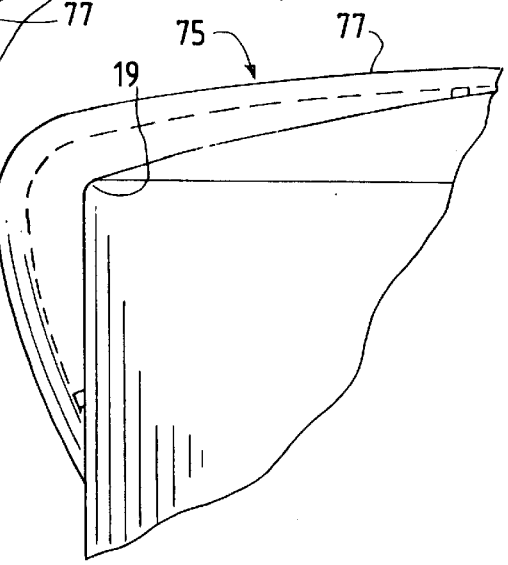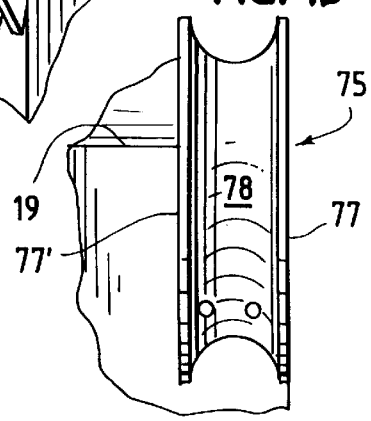

ROLL ASSIST MECHANISM FOR TARP SYSTEMS

BACKGROUND OF THE INVENTION

1. Field of the Invention

The present invention relates generally to tarp systems including fabric or other flexible material and associated metal hardware for covering an open top truck box, railcar, other vehicle or stationary container. More particularly, the invention relates to mechanisms for facilitating the rolling or unrolling of flexible material between a rolled up condition and the unfurled condition to cover an opening.

2. Description of the Prior Art

Various types of truck, trailer, railcar and moveable and stationary container bodies are designed to be loaded through an open top. Such bodies are typically used to haul or store hardware, equipment, produce, grain, stone, earth or refuse. It is desirable to use tarpaulins or other coverings to close the open tops of such containers. The tarpaulins serve to shelter the truck, trailer or container contents against the elements and to maintain the contents in the body.

Several systems are known for reversibly covering the open tops of vehicles, boxes and containers with tarpaulins. Typically, the covering is unrolled from a long tube or bar by manipulation of the associated metal hardware. The roll tube or roll bar is moved between an open, rolled-up position in which the covering is wrapped around the tube, exposing the interior of the container, and a closed, unfurled position in which the covering is spread over the top of the container.

Various ways have been employed to move the tube across the opening and to secure the free end near one edge of the vehicle, box or container top. The tube usually is rotated either manually or by an electric motor. These systems tend to use end caps and metal bows spanning the width of the opening to support the covering along the length of the open top.

An example of such a system is shown in U.S. Pat. No. Re. 31,746 issued to Dimmer et al., which is incorporated by reference herein in its entirety. As shown in the patent, a covering is attached along one lengthwise edge to a tube. One end of the tube is connected by a universal joint to a crank. The universal joint is reversibly attached to the roll tube by a spline and pin or similar mechanism.

An operator at ground level can turn the crank causing the tube to roll over the top of the container, such that the covering rolls up lengthwise on the tube. As a result, the material will uncover or cover the top of the trailer or container. In this arrangement, the end of the roll tube to which the universal joint and crank arm are attached can be described as the active end because the torque or turning force is applied there. Conversely, the opposite end can be described as the passive end because the torque is applied indirectly through the length of the tube.

A feature of the system shown in U.S. Pat. No. Re. 31,746 (and the commercial embodiment thereof) is an elastic cord (item 78) attached at one end to a narrower plastic tube within the roll tube or roll bar and at the other end to a forward edge of the latch plate (or, alternatively, to the body itself). (See U.S. Pat. No. Re. 31,746, column 4, lines 49–66.) When the roll tube is rolled across the top, the elastic cord pulls the passive end of the tube toward the latching side of the container to tension the end of the roll bar opposite the direct rolling force provided on the active end by the crank. Generally, the tensioning force is greatest when the roll bar is in the open position; this force decreases as the roll bar is moved closer to the latching side.

Another example of a tarp system is disclosed in U.S. Pat. No. 5,487,584, also incorporated by reference herein in its entirety.

Although the use of a resilient cord is intended to assist movement of the passive end of the roll tube, it has some disadvantages. For example, the resilient cord applies variable force as the roll bar moves across the opening. In essence, as the cord is stretched it applies an increasing force at one end of the bar in a different direction than the turning/rolling force applied directly by the crank arm at the opposite end. Also, the elastic cord stretches out over time, loses its pulling force, and is subject to being cut or breaking as a result of overuse or exposure to the elements.

During the opening operation, an imbalance of forces applied at the opposite ends of the roll bar can cause the covering material to be wrapped more tightly around one end of the bar or tube than the material on the other end. This will result in one end progressing more slowly than the other end. As a result, one end of the roll tube tends to advance faster than the other end during opening or closing operations, occasionally resulting in stationary unwinding of the covering from the bar at one end. Such uneven rolling may cause the operator to try to use the crank arm to slide, push or pull one end of the roll bar and associated covering material to advance it to a position even with the other end.

It is an object of the invention to provide an assist mechanism for a rolling tarp system whereby a more even winding or unwinding of the covering on the roll bar is achieved. It is another object of the invention to provide an apparatus where uneven rolling or unrolling is less likely to occur or is avoided altogether. It is a further object of the invention to provide a mechanism that assists with even progression of the two roll bar ends as the bar is rolled across the opening of a vehicle, box or container. Still further it is desirable to provide an assist mechanism that may be retrofitted readily to existing covering apparatus to improve the rolling operation. It is yet another objection of the invention to eliminate the disadvantages of use of the elastic cord, such as fraying, breaking, or loss of elasticity.

SUMMARY OF THE INVENTION

The present invention is an improvement for a tarp system for an open top container, wherein the tarp has first and second longitudinal edges and the container has first and second longitudinal sides, the tarp being attached on one longitudinal edge to the first longitudinal side of the container and on the other longitudinal edge to a roll bar. The roll bar is caused to roll by a force applied on at least one end of the bar. The improvement relates to a mechanism for assisting movement of the roll bar across the opening of the container.

The improvement comprises a roll assist apparatus including at least one reel fixedly attached to one end of the roll bar and a constant force spring having a first end fixedly attached to the reel and a second end attached to the second longitudinal side of the container. The roll bar is adapted to roll across the top of the container between the first and second longitudinal sides. When the roll bar is at the first side of the container, the tarp is rolled around the roll bar so that the top opening of the container is uncovered, and the constant force spring is extended. As the roll bar rolls toward the second longitudinal side of the container, the tarp unfurls to cover the top opening side of the container, and the constant force spring winds into a coil around the reel.

The constant force spring, by its nature, is biased to wind up on itself. This force tends to pull the tarp toward the unfurled position. Unlike a stretch cord, which has an increasing force as the roll bar moves away from the unfurled position, the force applied to the roll bar by the constant force spring is relatively constant over its length. The spring also is highly durable and unstretchable.

BRIEF DESCRIPTION OF THE DRAWINGS

The foregoing and other novel features and advantages of the invention will be better understood upon a reading of the following detailed description taken in conjunction with the accompanying drawings wherein:

FIG. 11 is a side view of an alternative embodiment of the hinge and mounting for the constant force spring;.

FIG. 12 is a second alternative embodiment of the hinge mounting;

FIG. 13 is a perspective view of a corner track for receiving the extended constant force spring over the trailer container to prevent back load on the constant force spring at the edge of the container;

FIG. 14 is a side view of the corner track shown mounted on the trailer container, partially showing the container and end cap; and, FIG. 15 is a front view of the corner track.

DETAILED DESCRIPTION OF THE PREFERRED EMBODIMENTS

Figure 1:
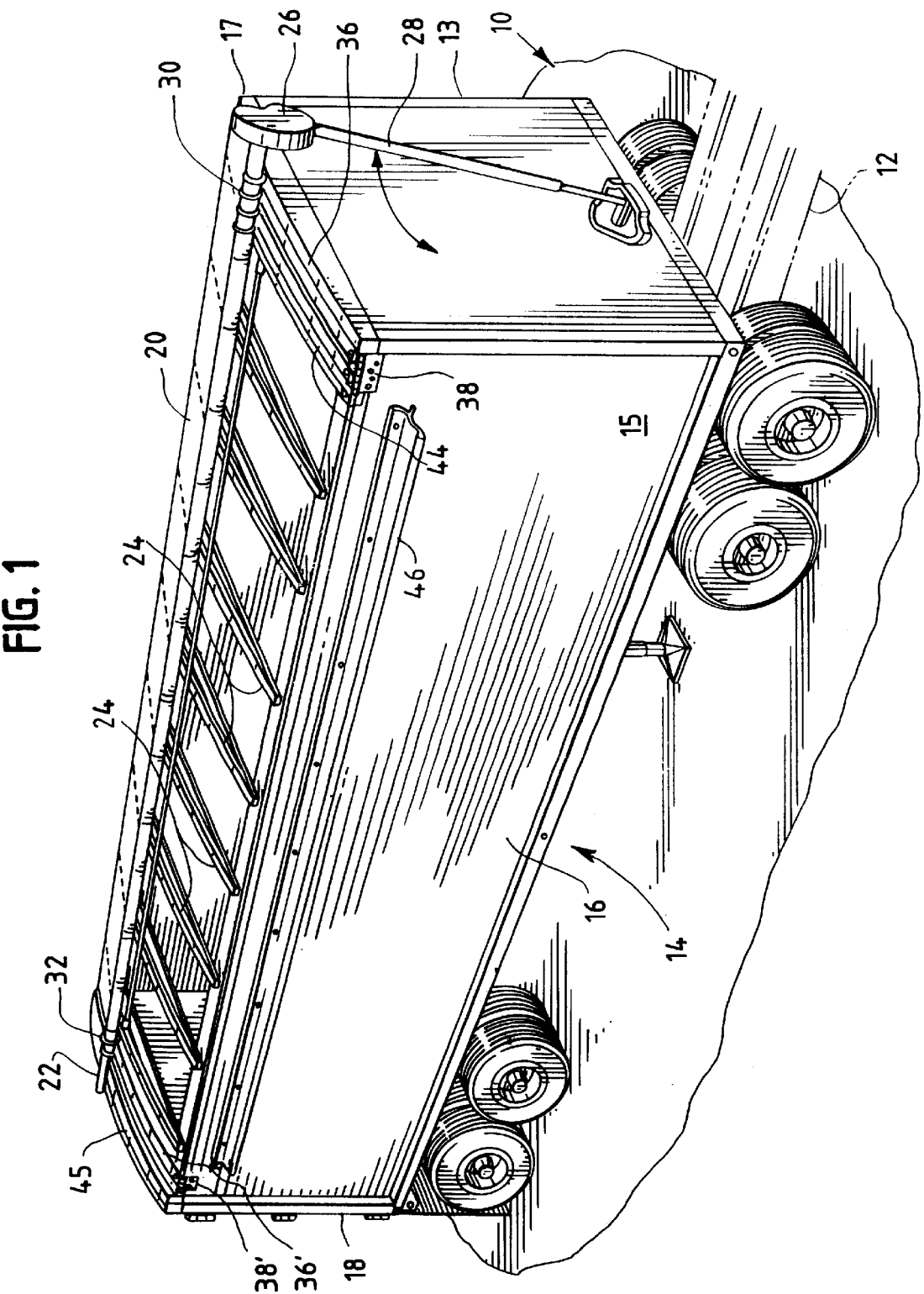
FIG. 1 is a right front perspective view of a trailer shown with a tarp system having a roll assist mechanism constructed in accordance with the principles of the invention, the tractor being partially shown.
Figure 2:
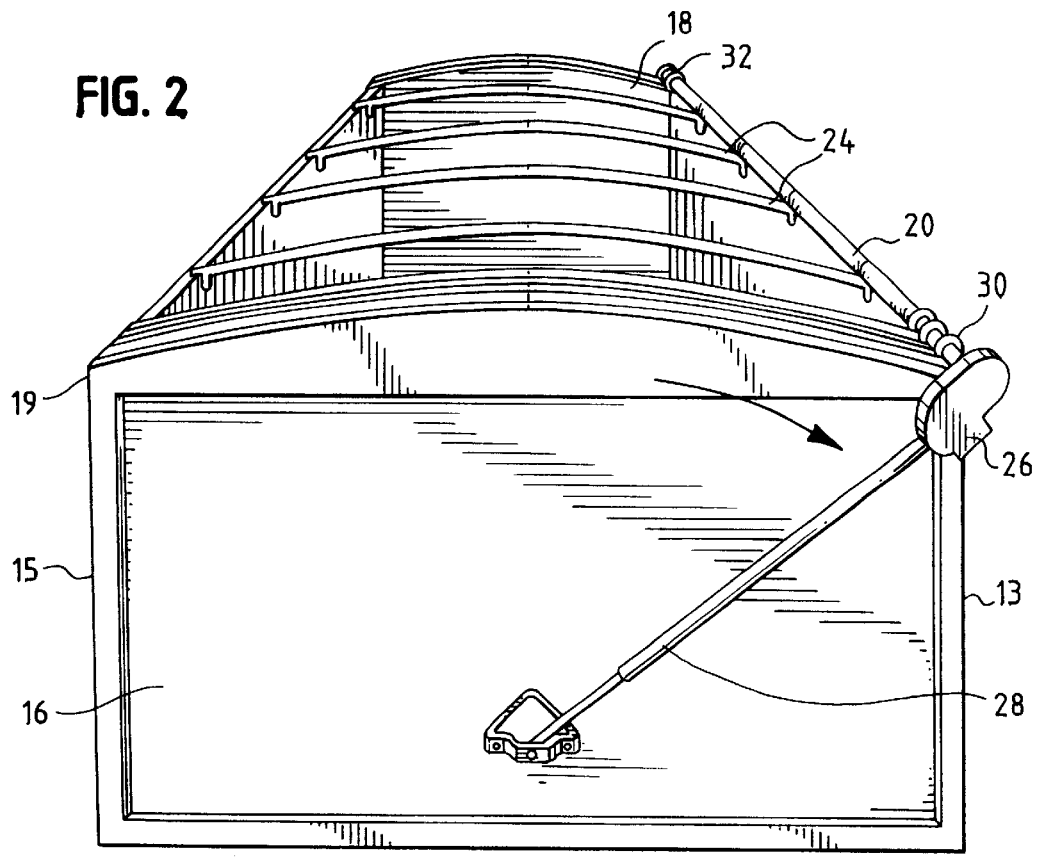
FIG. 2 is a front perspective view of a trailer container with the inventive roll assist system in a rolled-up position such that the container opening is uncovered.
Figure 3:
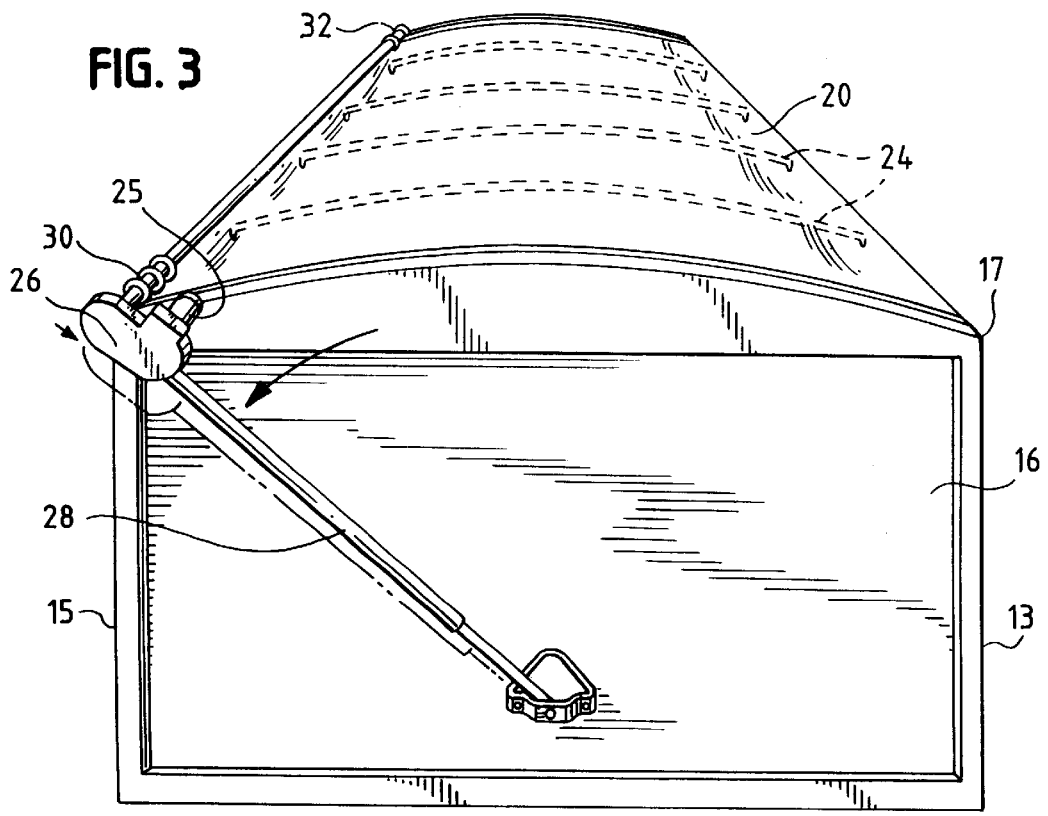
FIG. 3 is a front perspective view of a trailer container with the inventive roll assist system in an unfurled position such that the container opening is covered.

Referring now to the drawings, and initially to FIGS. 1–3, a tractor trailer is partially shown in perspective and designated generally by the reference numeral 10. The tractor trailer 10 comprises a truck tractor 12 adapted to connect to and pull a trailer 14 as well known in the art. The trailer includes an open-top container 16 particularly suitable for hauling materials such as grain, earth, refuse, or the like, which materials generally are loaded into the container 16 through the open top. The loaded material may be removed from the container 16 through a trap door in the floor (not shown) or through rear doors 18. Container 16 has a first longitudinal side 13 having a top edge 17, and a second longitudinal side 15 having a top edge 19. A similar trailer construction is shown in U.S. Pat. No. Re. 31,746, the disclosure of which is incorporated herein in its entirety.

The illustrated container 16 is provided with a cover system to protect the contents from the elements such as rain, sleet, snow, and to ensure that they are retained within the container 16 during high winds produced by weather or by movement of the trailer 14. The covering system includes a tarp 20 which may be constructed of vinyl, canvas or other flexible materials. Tarp 20 is generally of the same size and shape as the opening of container 16, and has first and second longitudinal edges. One longitudinal edge of tarp 20 is secured to a first longitudinal edge 17 of container 16 by metal hardware known in the art. (See, for example, U.S. Pat. No. Re. 31,746). The second longitudinal edge of tarp 20 is secured to a roll bar or tube 22. Roll bar 22 is substantially the same length as container 16. Suitable bows 24 span the width of the container 16 at spaced intervals to support the tarp 20 over the container 16 when the tarp is unfurled. In FIG. 1, tarp 20 is shown partially unfurled over the top of container 16.

In one preferred form of the covering system, an electrically operated drive assembly is used to roll the roll bar 22 back and forth between longitudinal edges 17 and 19 of container 16, and thus roll up or unroll the tarp 20 over the container 16. The drive assembly comprises preferably a 12 volt DC electric motor 25 (FIG. 3) connected to a gear reduction mechanism 26 to which the roll bar 22 is attached. The motor 25 and gear reduction mechanism 26 are supported on a telescoping tube assembly 28 that is pivotably attached to the front of the container 16. As illustrated in FIGS. 1–3, an operator may activate the motor 25, which is preferably of a reversible type, to roll the roll bar 22 from edge 19 to edge 17, causing the tarp 20 to be rolled up on the roll bar 22 thereby uncovering the container 16. When rolled in the opposite direction the tarp 20 is unfurled to cover the open top.

In accordance with the invention, the rolling motion of the roll bar across the top of the container is facilitated by one or more constant force springs. As known in the mechanical arts, the term "constant force spring" is used to describe a strip of flat material that has been wound to a given curvature so that in its relaxed condition it is in the form of a tightly wound coil or spring. When deflected, the spring material straightens as it leaves the coil. The straightened length of spring stores the spring's energy through its tendency to assume its natural radius.

Figure 4:
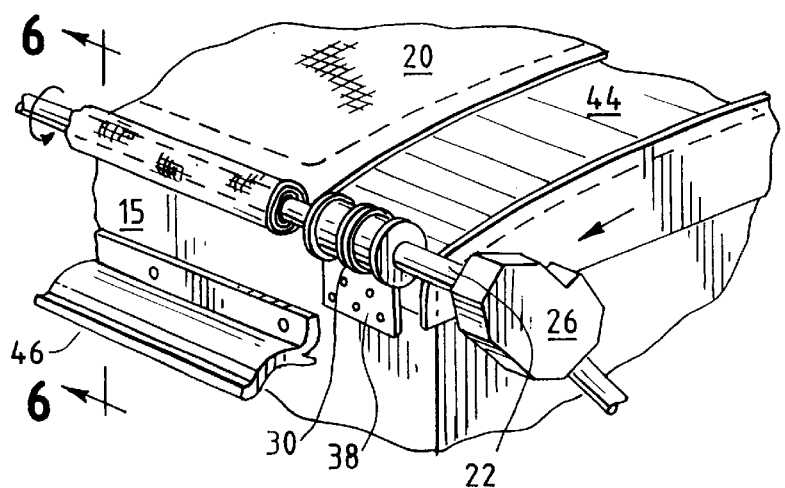
FIG. 4 is a partial right front perspective view of the container showing the roll assist system in a nearly unfurled position.
Figure 5:
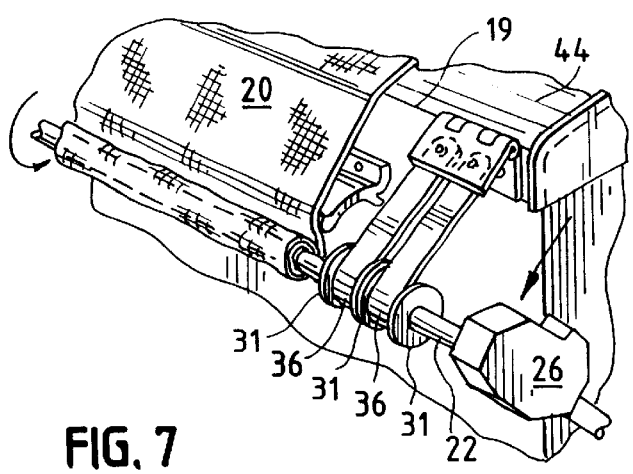
FIG. 5 is a view similar to FIG. 4 but illustrating the roll assist system in a more fully unfurled position.

The illustrated embodiment of a roll assist system includes a double reel member 30 fixedly attached to the forward end of the roll bar 22 and a single reel member 32 fixedly attached to the rearward end of the roll bar 22. The reels 30, 32 may be formed from suitable metallic materials, molded thermoplastic, or other plastic materials. A pair of constant force spring members 36 in the form of substantially flat flexible strips are fixedly attached at one end thereof to the double reel member 30. Similarly, a single constant force spring member 36' is fixedly attached to the single reel member 32. The opposite ends of the constant force spring members 36 and 36' are attached to hinge plates 38 and 38', mounted on container side 15 with hinge pins 41 aligned with longitudinal edge 19 (FIGS. 4, 5). Alternative means for pivotably mounting the ends of the springs to container side 15 are discussed below.

Preferably the constant force spring members 36, 36' suitable for use in the instant invention are made from a high yield metal such as 301 stainless steel and having a constant pull force of about 30 pounds, although the invention is not so limited. The two springs 36 at the forward end of the container 16 are effective to assist movement of tarp 20, motor assembly 25, and gear reduction mechanism 26. It can be appreciated that a single, larger spring would be an effective alternative.

As the constant force spring 36 is unwound from the reel 30, its tendency is to coil back up on itself on the reel. The pull back force depends on the material thickness and width as well as how it is wound. Constant force springs which can be used in the practice of the invention are commercially available from John Evans' Sons, Inc. of Lansdale, Pa., and other suppliers.

In a preferred embodiment, each 301 stainless steel constant force spring is approximately 0.022 inches thick and about 4.00 inches wide. Typically, the spring is long enough to at least span the width of an opening of a standard trailer container, i.e., the distance between first longitudinal edge 17 and second longitudinal edge 19. A spring with these specifications can be made to exert an approximately constant force of 33 lbs. on the roll bar 22 in the direction of side 15. This 33 lbs. force does not vary significantly as reels 30, 32 are rolled from one side of the opening to the other.

The reels 30, 32 preferably each have a 2 inch cylindrical hole which mates with the 2 inch diameter roll bar 22 to which it is attached in ways well known in the art. Preferably, the reels have flanges 31, which are preferably about five inches apart, one inch more than the four inch width of the springs 36, 36' to accommodate the spring and to assure that the spring is evenly wound onto itself. The flanges 31 are preferably about ½ inch thick. The distance from the outside of one flange to the outside of the other, therefore, is 6 inches in the preferred embodiment. Typically, the flanges are about one inch deep, a depth that assures that the flanges will be at least as high off the reel as the spring when it is completely wound around the reel.

Figure 6:
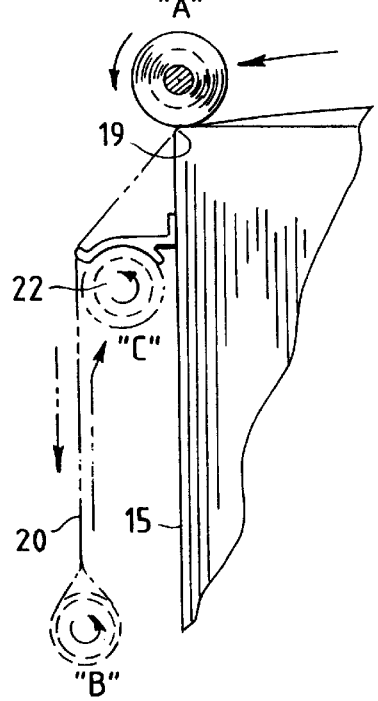
FIG. 6 is a cross-sectional view taken substantially along the line 6—6 of FIG. 4, and further showing the roll bar in different positions in phantom lines.

The operation of the roll assist system now can be appreciated with reference to FIGS. 4–6 which illustrate the roll bar 22 with forward double reel member 30 in various positions together with the constant force spring members 36 in various extended and retracted positions. An aspect of the invention is that the container 16 preferably is provided with forward and rearward panel members or end caps 44 and 45 (see FIG. 1) which are helpful in supporting the springs 36 and 36', respectfully, when the tarp 20 is in the rolled up condition and the springs are extended. These end caps 44, 45 cover opposed ends of the container 16 and may be of a sheet metal material or can even be formed of the same flexible material as the tarp 20.

FIGS. 4–6 illustrate the roll assist system in a position wherein the tarp 20 is in a nearly completely unfurled position (FIG. 4, FIG. 6, position A) and in a more fully unfurled position (FIG. 5, also illustrated in phantom in FIG. 3). In the fully unfurled position the hinge plates 38, 38' to which the spring members 36 are fixedly attached rotate and allow the roll bar 22 to seat underneath a longitudinal latch plate or ledge 46 (FIG. 6, position C) attached on side 15 near second lengthwise edge 19 of the container 16.

Figure 7:
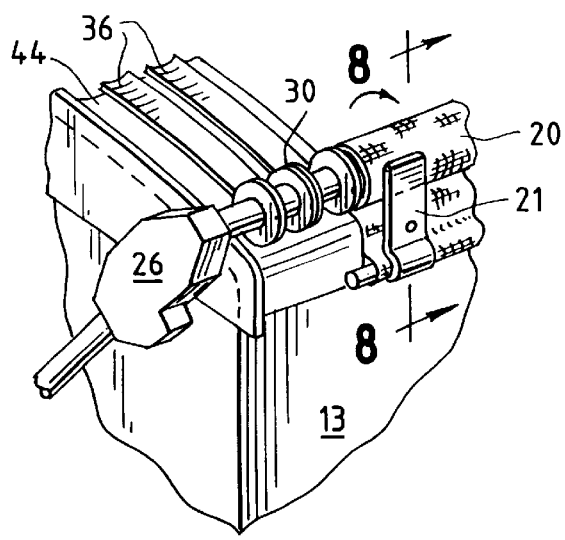
FIG. 7 illustrates a partial left front perspective view of a front upper corner of the trailer showing the constant force springs in an extended condition and the tarp in a completely rolled-up condition.
Figure 8:
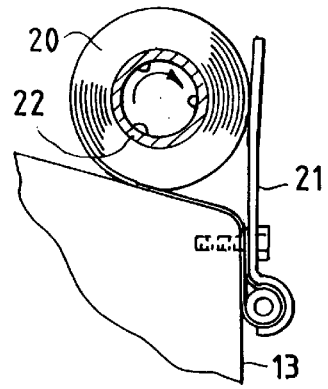
FIG. 8 is a cross-sectional view taken substantially along the line 8—8 of FIG. 7.

FIGS. 7 and 8 illustrate the roll bar 22 with the tarp 20 fully wound thereon, thereby opening the top of the container 16. In this position of the roll bar 22, the constant force spring members 36 are fully deployed from the reel member 32 and extend across the full width of the end cap 44 and container 16. The rolled tarp 20 abuts stop member 21 mounted to side 13 and extending above edge 17 of container 16.

Figure 9:
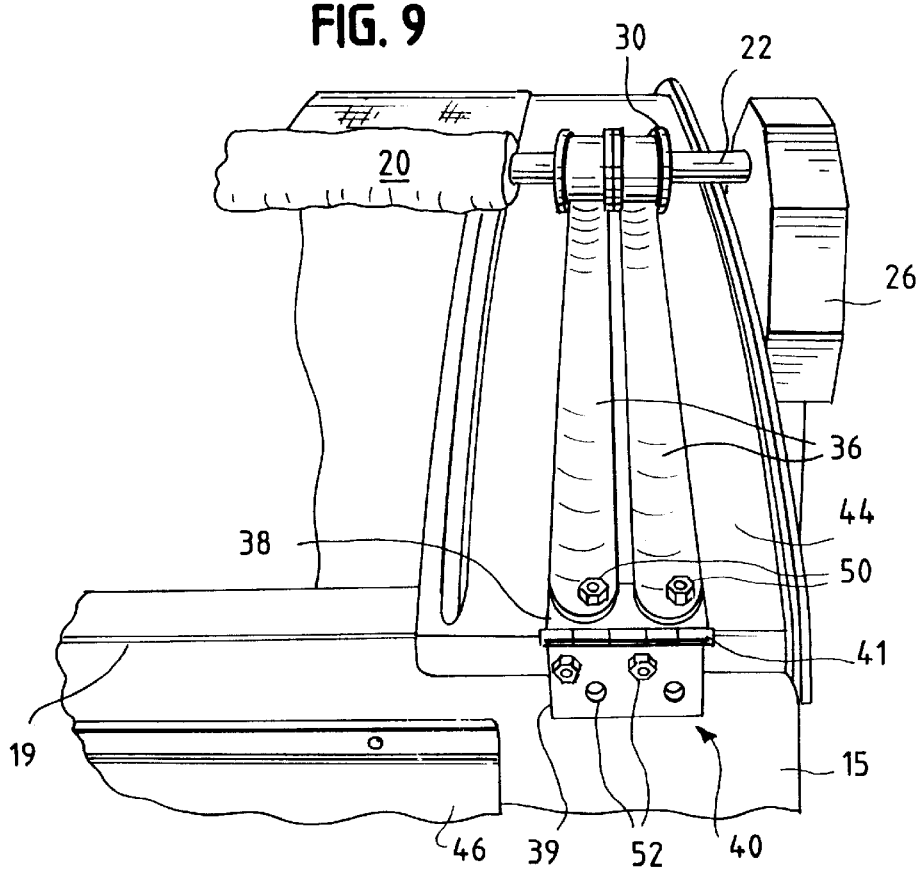
FIG. 9 is a side perspective view of an upper portion of the front of the trailer showing the springs in a partially extended condition.
Figure 10:
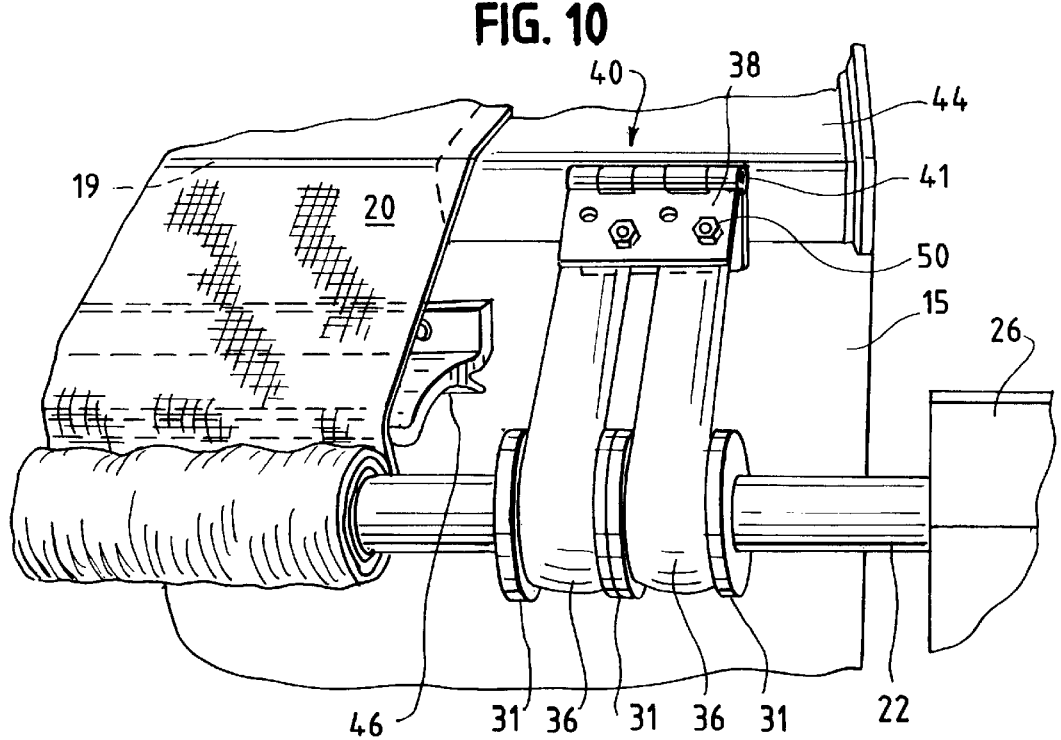
FIG. 10 is a side perspective view of an upper portion of the front of the trailer showing the tarp as fully covering the trailer.

FIGS. 9 and 10 illustrate in detail the construction and function of the hinge plate 38 which is essentially identical to the structure and function of hinge plate 38'. Each hinge plate 38 comprises a first plate portion 39 fastened by suitable screws or rivets 52 to the side 15 of the container 16, and a second plate portion 40 that rotates relative to first plate portion 39 along hinge pin 41. Hinge pin 41 is substantially aligned with edge 19 of side 15. Constant force spring members 36 are each fastened by suitable screws or rivets at one end thereof to second plate portion 40. When the constant force spring members 36 are in an extended condition, as shown in FIG. 9, the second plate portion 40 is open and lays across the top of end cap 44, allowing the spring members 36 to be supported on the end cap 44. When the tarp 20 is more fully unwound from the roll bar 22, as shown in FIGS. 5 and 10, the second plate portion 40 pivots about hinge pin 41 and nearly closes against first portion 39. Roll bar 22 drops past ledge 46 until the tarp is completely unwound and roll bar 22 is in the lowest of the three positions illustrated in FIG. 6 (position B). The roll bar 22 then moves back upward and the tarp 20 rewinds on the roll bar 22, until the roll bar 22 is engaged underneath latchplate or ledge 46, also shown in FIG. 6 (position C). Preferably, longitudinal latchplate or ledge 46 is about four inches, below edge 19, and the lowest position C of FIG. 6 is about 18 inches below edge 19.

FIGS. 11 and 12 illustrate alternative embodiments of means for pivotably mounting an end of a constant force spring to a side of the container. As illustrated in FIG. 11, two stationary brackets 60, 60' of L-shaped cross-section each have a slot 62, 62' in one side thereof. Stationary brackets 60, 60' are mounted to the outer surface of container 16 such that slots 62, 62' are in vertical parallel alignment with one another and extend outwardly from the container side. The upper portions of the slots 62, 62' extend above edge 19 of container wall 15. A sliding bracket 64 has a first flat end 66 adapted to be fixedly connected to the end of constant force spring 36 and a second end in the form of a substantially closed loop 68. Pin 69 is of sufficient length and appropriate diameter to extend through slot 62', substantially closed loop 68, and slot 62. Sliding bracket 66 can slide up and down along slots 62, 62', providing pivotable and vertical movement of the end of constant force spring 36. When sliding bracket 66 is at the bottom of slots 62, 62', roll bar 22 will be seated underneath longitudinal latchplate or ledge 46 (FIG. 6, position C), and when sliding bracket 66 is at the top of slots 62, 62', bracket 66 can rotate to allow constant force spring 36 to extend over the opening of container 16.

FIG. 12 illustrates an alternative configuration of stationary brackets 60, 60'. U-shaped bracket 70 has two parallel legs 71, 71', each being provided with a slot 72, 72'. When bracket 70 is mounted to a side of container 16, slots 72 and 72' will be in vertical parallel alignment with one another. A sliding bracket 66 with pin 69 as shown in FIG. 11 can be attached at one end to an end of constant force spring 36 and move vertically between the legs 71, 71' of bracket 70, while allowing pivoting of the end of the spring.

FIGS. 13–15 illustrate an alternative to the disclosed hinge constructions. End cap 44 is provided at the side 15 of the container 16 with a corner track element 75. Corner track element 75 is secured at its lower end with mounting means 76, which will be below latchplate 46. Corner track element 75 is also secured at its upper end and to end cap 44 with similar mounting means, not shown. Corner track element 75 comprises side rails 77, 77' disposed on either side of track 78, which is preferably of concave cross-section. Corner track element 75 is disposed directly over reel 30 when the tarp 20 is completely unfurled as illustrated in FIG. 5. Constant force spring 36 is mounted directly to side 15 of the container below corner track element 75. As the roll bar 22 is moved to wind up tarp 20 and uncover the top of container 16, constant force spring 36 unwinds from reel 30 and is guided by corner track element 75 into proper position over end cap 44. Side rails 77, 77' of corner track 75 are spaced from one another so as to extend on either side of constant force spring 36 as spring 36 unrolls.

It can now be appreciated that a roll assist system constructed according to the invention provides a highly effective means for assisting in both rolling up and unrolling a tarp evenly across the length of a roll bar. Thus, the need for an operator to manually push or pull the active end of the roll bar to adjust or straighten the tarp is minimized or eliminated altogether, without the disadvantages of using a stretch cord.

While the present invention has been described in connection with preferred embodiments thereof, it will be apparent to those skilled in the art that many changes and modifications may be made without departing from the true sprit and scope of the present invention. Accordingly, it is intended by the appended claims to cover all such changes and modifications as come within the spirit and scope of the invention.

What is claimed is:

1. A roll tarp system for an open top vehicle or container, the system comprising:
    a roll bar;
    a flexible material having dimensions approximately matching the dimensions of the open top, the flexible material having first and second longitudinal edges, the flexible material attached along one longitudinal edge to the vehicle or container and along the other longitudinal edge to the roll bar;
    a reel fixedly attached to the roll bar;
    a constant force spring having a first end fixed to said reel such that the spring is windable thereon, and having a second end mounted to the vehicle or container;
    whereby rolling of the roll bar in one direction winds the spring onto the reel and rolling the roll bar in the other direction unwinds the spring from the reel.

2. The roll tarp system of claim 1 wherein the roll bar has two ends, and further comprising an electric motor at one end.

3. The roll tarp system of claim 2 wherein the reel is located near the end of the roll bar where the electric motor is located.

4. The roll tarp system of claim 3 further comprising:
    a second reel, the second reel being located near the end of the roll bar opposite where the electric motor is located; and,
    a second constant force spring having two ends, one end attached to the second reel and the other attached to the vehicle or container.

5. The roll tarp system of claim 4 further comprising:
    a third reel, the third reel located near the end of the roll bar where the electric motor is located; and,
    a third constant force spring having two ends, one end attached to the third reel and the other attached to the vehicle or container.

6. The roll tarp system of claim 5 further comprising means for pivotably mounting an end of at least one of the springs to the vehicle or container.

7. The roll tarp system of claim 6 wherein said means comprises a hinge.

8. A roll tarp system for an open top vehicle or container, the opening having longitudinal and widthwise dimensions and edges at its perimeter, the system comprising:
    a roll bar having first and second ends;
    a flexible material having longitudinal and widthwise dimensions approximately matching the dimensions of the open top, the flexible material attached along one longitudinal edge near to a longitudinal edge of the opening, the flexible material being attached along its opposite longitudinal edge to the roll bar;
    means for rolling the roll bar attached to the first end of the roll bar;
    a reel attached to the roll bar; and,
    a constant force spring adapted for winding on the reel, the spring having length approximately matching the widthwise dimension of the opening, the spring being attached at one end to the reel, and the spring being mounted at the other end to the vehicle or container;
    whereby rolling the roll bar in one direction will wind the spring on the reel while unwinding the flexible material from the roll bar, and rolling of the roll bar in the opposite direction will unwind the spring from the reel while winding the flexible material onto the roll bar.

9. The roll tarp system of claim 8 wherein the means for rolling the roll bar is a crank.

10. The roll tarp system of claim 9 wherein the crank is attached to the roll bar by a universal joint.

11. The roll tarp system of claim 8 wherein the means for rolling the roll bar is an electric motor.

12. The roll tarp system of claim 8 further comprising means for pivotably mounting an end of at least one of the springs to the vehicle or container.

13. The roll tarp system of claim 12 wherein said means comprise a hinge.

14. The roll tarp system of claim 8 wherein the first reel is located near an end of the roll bar, and further comprising:
    a second reel, the second reel being attached to the roll bar near the other end thereof; and,
    a second constant force spring adapted for winding on the second reel, the spring having length approximately matching the widthwise dimension of the opening, the spring being attached at one end to the second reel and at the other end to the vehicle or container;
    whereby rolling the roll bar will wind the second spring on the second reel.

15. The roll tarp system of claim 14 further comprising:
    a third reel, the third reel being attached to the roll bar near the end where the means for rolling is located; and,
    a third constant force spring adapted for rolling on the third reel, the third spring having length approximately matching the widthwise dimension of the opening, the third spring being attached at one end to the third reel and at the other end to the vehicle or container;
    whereby rolling of the roll bar will wind the third spring on the third reel.

16. A roll tarp system for reversibly covering an open top of a vehicle or container, the roll tarp system including a roll bar having first and second ends, a flexible material approximately matching-the dimensions of the opening, the flexible material attached along one longitudinal side to the roll bar and along another longitudinal side to the vehicle or container, and means for rolling the roll bar attached to the first end of the roll bar to roll the roll bar along the opening of the vehicle or container, thereby to wind and unwind the flexible material on the roll bar, the improvement comprising:

a reel attached near an end of the roll bar; and, a constant force spring having length approximately matching the widthwise dimension of the opening and adapted to be wound upon the reel, the spring attached at one end to the reel and at the other end by mounting means to the vehicle or container;

whereby rolling the roll bar in one direction will wind the spring on the reel and rolling the roll bar in the opposite direction will unwind the spring from the reel.

17. The roll tarp system of claim 16 wherein the means for rolling the roll bar is an electric motor and the reel is attached to the first end of the roll bar.

18. The roll tarp system of claim 16 further comprising;

a second reel attached near an end of the roll bar; and, a second constant force spring having length approximately matching the widthwise dimension of the opening and adapted to be wound upon the second reel, the second spring attached at one end to the second reel and at the other end to the vehicle or container.

19. The roll tarp system of claim 18 further comprising;

a third reel attached near an end of the roll bar; and, a third constant force spring having length approximately matching the widthwise dimension of the opening and adapted to be wound upon the third reel, the third spring attached at one end to the third reel and at the other end to the vehicle or container;

wherein the third reel is located near the second end of the roll bar.

20. The roll tarp system of claim 16 wherein said mounting means comprises a hinge attached between the spring and the container.

21. The roll tarp system of claim 20 wherein said hinge comprises a first plate portion mounted to said container, and a second plate portion pivotably attached to said first plate portion, an end of said spring being fixedly secured to said second plate portion.

22. The roll tarp system of claim 20 wherein said hinge comprises a pivoting bracket slidably mounted in at least one stationary bracket, an end of said spring being fixedly secured to said pivoting bracket.

23. The roll tarp system of claim 16 wherein said mounting means comprises means for directly mounting an end of said spring to said container, said system further comprising a corner track means mounted at the corner of the top and side of the container, to facilitate winding and unwinding of said spring at said corner.

* * * * *